(12) United States Patent
Hu et al.

(10) Patent No.: US 9,543,846 B2
(45) Date of Patent: Jan. 10, 2017

(54) SWITCHING POWER SOURCE, METHOD AND CONTROL CHIP FOR CONTROLLING THE SAME

(71) Applicant: BYD Company Limited, Shenzhen (CN)

(72) Inventors: Chuhua Hu, Shenzhen (CN); Xingfu Jiang, Shenzhen (CN); Xiaohua Yang, Shenzhen (CN)

(73) Assignee: BYD Company Limited (CN)

( * ) Notice: Subject to any disclaimer, the term of this patent is extended or adjusted under 35 U.S.C. 154(b) by 29 days.

(21) Appl. No.: 14/654,869

(22) PCT Filed: Dec. 25, 2013

(86) PCT No.: PCT/CN2013/090429
§ 371 (c)(1),
(2) Date: Jun. 23, 2015

(87) PCT Pub. No.: WO2014/101767
PCT Pub. Date: Jul. 3, 2014

(65) Prior Publication Data
US 2015/0340954 A1     Nov. 26, 2015

(30) Foreign Application Priority Data
Dec. 31, 2012   (CN) .......................... 2012 1 0591525

(51) Int. Cl.
    *H02M 3/335*     (2006.01)
    *H05B 33/08*     (2006.01)

(52) U.S. Cl.
    CPC ..... *H02M 3/33507* (2013.01); *H05B 33/0815* (2013.01); *Y02B 20/347* (2013.01)

(58) Field of Classification Search
    CPC .............. H02M 3/335; H02M 3/33507; H02M 3/33523;H02M 3/33569; H02M 3/33592; H02M 1/32; H02M 1/36; H02M 2001/0032; Y02B 70/1441; Y02B 70/1475
(Continued)

(56) References Cited

U.S. PATENT DOCUMENTS 8,742,674 B2 *   6/2014   Shteynberg ........ H05B 33/0815
                                                                              315/201
9,178,444 B2 *   11/2015   Maru ....................... H02M 1/44
(Continued)

FOREIGN PATENT DOCUMENTS

CN        101951708 A     1/2011
CN        102387628 A     3/2012
(Continued)

*Primary Examiner* — Yemane Mehari
(74) *Attorney, Agent, or Firm* — DLA Piper LLP (US)

(57) ABSTRACT

A switching power source includes: a dimmer connected to an alternating current power supply and having a plurality of operating modes; a filtering/rectifying module connected to the dimmer to filter an alternating current output from the dimmer to obtain a filtered alternating current and rectify the filtered alternating current into a direct current; a dimmer switching module connected to the dimmer; a control module connected to the filtering/rectifying module and the dimmer switching module, respectively, and configured to detect a current operating mode of the dimmer when the switching power source is powered on, generate a dimmer control signal according to the current operating mode, and control the dimmer switching module to turn on or off according to the dimmer control signal to control the dimmer to enter an operating mode; and a primary constant current circuit connected to the control module and the filtering and rectifying module.

19 Claims, 7 Drawing Sheets

(58) Field of Classification Search
USPC .......................................... 363/21.01–21.18
See application file for complete search history.

(56) References Cited

U.S. PATENT DOCUMENTS

| | | | |
|---|---|---|---|
| 2005/0094420 A1 | 5/2005 | Nakao et al. | |
| 2011/0080111 A1* | 4/2011 | Nuhfer | H05B 33/0815 315/291 |
| 2011/0309759 A1* | 12/2011 | Shteynberg | H05B 33/0815 315/201 |
| 2012/0249012 A1* | 10/2012 | Xu | H05B 33/0815 315/291 |
| 2013/0154493 A1 | 6/2013 | Liang et al. | |
| 2013/0154496 A1* | 6/2013 | Maru | H02M 1/44 315/210 |

FOREIGN PATENT DOCUMENTS

| | | |
|---|---|---|
| CN | 202310225 U | 7/2012 |
| EP | 1 443 633 A2 | 8/2004 |
| WO | 2012/031883 | 3/2012 |

\* cited by examiner

SWITCHING POWER SOURCE, METHOD AND CONTROL CHIP FOR CONTROLLING THE SAME

CROSS REFERENCE TO RELATED APPLICATION

This application claims priority and benefits of Chinese Patent Application No. 201210591525.8, filed with State Intellectual Property Office, P. R. C. on Dec. 31, 2012, the subject matter of which is incorporated herein by reference.

TECHNICAL FIELD

This disclosure generally relates to the electronic technology field and, more particularly, to a switching power source, a method of controlling a switching power source and a control chip that controls a switching power source.

BACKGROUND

Currently, with the enhancement of people's awareness of protecting the environment and saving energy, a new generation of semiconductor lighting sources has become the mainstream lighting source due to its high efficiency, low consumption, energy conservation, environment protection, rapid response, long service life and the like. Nowadays, many common lighting products make use of the silicon controlled dimming solution, which seeks to ensure the normal operation of a dimmer system with minimal cost and without changing the dimmer system, and provides the power source with a high-precision constant current function and a high power factor.

For existing control chips which realize the high-precision constant current function and the high power factor, many elements must be connected to the peripheral system to ensure normal operation of the silicon controlled dimmer as shown in a dashed box of FIG. 1. In conventional solutions, a fourteenth resistor R14 is used as a dummy load to provide a conduction circuit for the silicon controlled rectifier to ensure normal timing of the silicon controlled dimmer. However, when the silicon controlled rectifier is conducted, the conduction current in the silicon controlled rectifier is great, even reaches to dozens of milliamperes, which may result in that the fourteenth resistor R14 consumes too much power. Thus, the tenth resistor R10, the twelfth resistor R12, the fifteenth resistor R15, the third triode Q3, the thirteenth resistor R13 and the seventh capacitor C7 start timing after the silicon controlled rectifier is conducted, and control the second MOS transistor Q2 to turn on to short the fourteenth resistor R14, thus reducing the power consumption of the fourteenth resistor R14. The third triode Q3 is configured to leak electric charges in the seventh capacitor C7 to ensure that the tenth resistor R10, the twelfth resistor R12, the fifteenth resistor R15, the third triode Q3, the thirteenth resistor R13 and the seventh capacitor C7 start to time normally after the silicon controlled rectifier is conducted such that the second MOS transistor Q2 is controlled to turn on when the next timing starts. Apparently, to ensure normal operation of the silicon controlled dimmer, the conventional solution requires many elements, which increases the cost of the power source.

SUMMARY

We provide a switching power source, including a dimmer connected to an alternating current power supply and having a plurality of operating modes; a filtering and rectifying module connected to the dimmer and configured to filter an alternating current output from the dimmer to obtain a filtered alternating current and rectify the filtered alternating current into a direct current; a dimmer switching module; connected to the dimmer; a control module connected to the filtering and rectifying module and the dimmer switching module, respectively, and configured to detect a current operating mode of the dimmer when the switching power source is powered on, to generate a dimmer control signal according to the current operating mode, and to control the dimmer switching module to turn on or off according to the dimmer control signal to control the dimmer to enter a desired operating mode; and a primary constant current circuit connected to the control module and the filtering and rectifying module, respectively, wherein the control module controls the primary constant current circuit to output a constant current.

We also provide a method of controlling a switching power source, wherein the switching power source includes a dimmer connected to an alternating current power supply and having a plurality of operating modes; a filtering and rectifying module connected to the dimmer and configured to filter an alternating current output from the dimmer to obtain a filtered alternating current and rectify the filtered alternating current into a direct current; a dimmer switching module connected to the dimmer; and a primary constant current circuit connected to the filtering and rectifying module, the method including powering on the switching power source; detecting a current operating mode of the dimmer; generating a dimmer control signal according to the current operating mode and controlling the dimmer switching module to turn on or off according to the dimmer control signal to control the dimmer to enter a desired operating mode; and controlling the primary constant current circuit to output a constant current.

We further provide a control chip that controls a switching power source including a dimmer and a filtering and rectifying module, wherein the dimmer connects to an alternating current power supply and has a plurality of operating modes, the filtering and rectifying module connects to the dimmer and configured to filter an alternating current output from the dimmer to obtain a filtered alternating current and rectify the filtered alternating current into a direct current, and the control chip includes a dimmer switching module connected to the dimmer; and a control module connected to the dimmer switching module and the filtering and rectifying module, respectively, and configured to detect a current operating mode of the dimmer when the switching power source is powered on, to generate a dimmer control signal according to the current operating mode, and control the dimmer switching module to turn on or off according to the dimmer control signal to control the dimmer to enter a desired operating mode.

Once the current operating mode of the dimmer is detected, the main switching transistor may be controlled to turn on. Thus, a response speed of the circuit is enhanced.

Additional aspects and advantages of representative, selected examples will be given in part in the following descriptions, become apparent in part from the following descriptions, or be learned from the practice of the examples.

BRIEF DESCRIPTION OF THE DRAWINGS

These and other aspects and advantages will become apparent and more readily appreciated from the following descriptions made with reference to the accompanying drawings.

Figure 1:
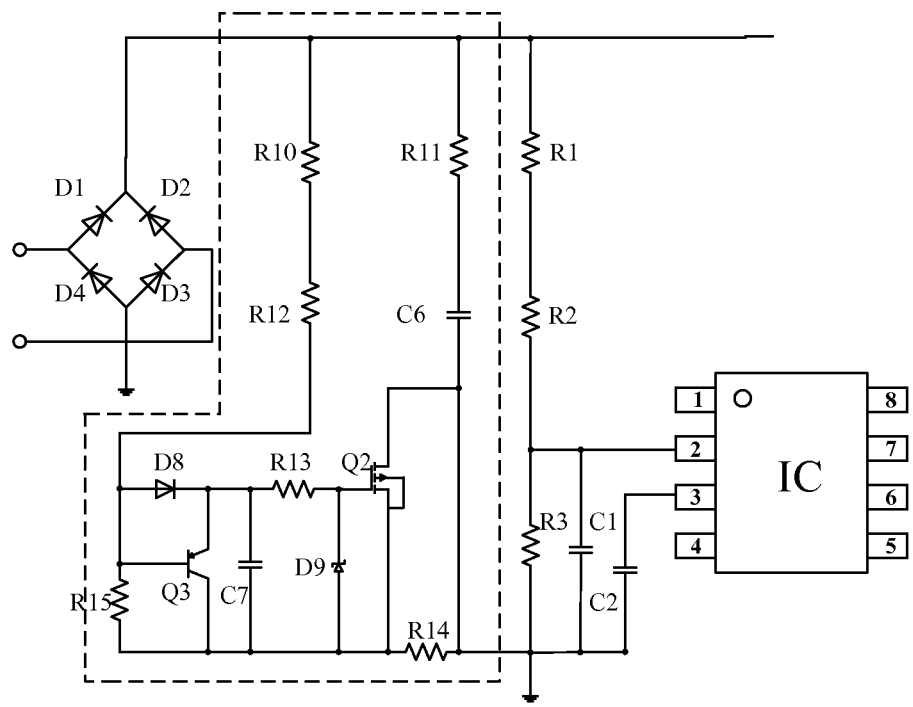
FIG. 1 is a schematic diagram of a control circuit that controls a silicon controlled dimmer in the related art.

REFERENCE NUMERALS 1 dimmer
21 control module
22 dimmer switching module
3 filtering and rectifying module
4 primary constant current circuit
41 primary winding
42 output winding
43 auxiliary winding
5 electric equipment
10 control chip
100 dimmer control circuit
101 timing module
102 mode detecting module
103 dummy load control module
104 driving circuit
105 processing circuit
200 primary constant current control circuit
201 multiplier
202 PFC logic module
203 over-current comparator
204 error amplifier
205 primary current detecting and control module
206 valley detecting module

DETAILED DESCRIPTION

We provide a first configuration of a switching power source. The switching power source may comprise: a dimmer connected to an alternating current power supply and having a plurality of operating modes; a filtering and rectifying module connected to the dimmer and configured to filter an alternating current output from the dimmer to obtain a filtered alternating current and to rectify the filtered alternating current into a direct current; a dimmer switching module connected to the dimmer; a control module connected to the filtering and rectifying module and the dimmer switching module, respectively, and configured to detect a current operating mode of the dimmer when the switching power source is powered on, to generate a dimmer control signal according to the current operating mode, and to control the dimmer switching module to turn on or off according to the dimmer control signal to control the dimmer to enter a desired operating mode; and a primary constant current circuit connected to the control module and the filtering and rectifying module, respectively, in which the control module controls the primary constant current circuit to output a constant current.

The switching power source can detect the current operating mode of the dimmer and generate a dimmer control signal according to the current operating mode. Thus, the dimmer having a plurality of operating modes can be selected when the switching power source is constructed, which facilitates constructing the power source. Furthermore, since the primary constant current circuit is controlled to turn automatically on or off according to the output current, the output current can be controlled to be a constant current. Moreover, we control the turn-on time of the dimmer by the control chip, thus only requiring the simple dimmer switching module, which reduces manufacturing costs.

The dimmer switching module may comprise a fourth resistor and a second MOS transistor, a first terminal of the fourth resistor connects to the dimmer, a second terminal of the fourth resistor connects to a drain of the second MOS transistor, a source of the second MOS transistor is grounded, and a gate of the second MOS transistor connects to the control module.

The dimmer switching module may only adopt one resistor and one MOS transistor to ensure normal operation of the dimmer. Compared to the related art that controls a turn-on time of the dimmer by a complex peripheral circuit, our dimmer switching module that controls the turn-on time of the dimmer is simpler, thus reducing a manufacturing cost of the switching power source.

The primary constant current circuit may comprise: a load module connected to the control module in which the control module detects a current of the load module and generates a switching control signal according to the current of the load module; a main switching transistor connected to the control module and the load module, respectively, in which the control module controls the main switching transistor to turn on or off according to the switching control signal; a primary winding connected to the main switching transistor and configured to convert the direct current into an electromagnetic signal; an output winding configured to output the constant current according to the electromagnetic signal generated by the primary winding; an auxiliary winding connected to the control module, in which the control module detects a degaussing time of the output winding via the auxiliary winding.

The primary constant current circuit can output the constant current under a control of the control module.

We also provide a control chip that controls a power switching source. The switching power source may comprise a dimmer and a filtering and rectifying module. The dimmer connects to an alternating current power supply and has a plurality of operating modes. The filtering and rectifying module connects to the dimmer and is configured to filter an alternating current output from the dimmer to obtain a filtered alternating current and rectify the filtered alternating current into a direct current. The control chip may comprise: a dimmer switching module connected to the dimmer; and a control module connected to the filtering and rectifying module and the dimmer switching module, respectively, and configured to detect a current operating mode of the dimmer when the switching power source is powered on, to generate a dimmer control signal according to the current operating mode, and to control the dimmer switching module to turn on or off according to the dimmer control signal to control the dimmer to enter a desired operating mode.

The control module may comprise a dimmer control circuit and the dimmer control circuit may comprise: a mode detecting module connected to the filtering and rectifying module, and configured to receive a voltage signal output from the filtering and rectifying module, to detect the current operating mode of the dimmer according to the voltage signal, and to generate a mode control signal according to the current operating mode of the dimmer; a dummy load control module connected to the mode detecting module and the filtering and rectifying module, respectively, and configured to receive the voltage signal output from the filtering and rectifying module and the mode control module output from the mode detecting module, and to generate the dimmer control signal.

The dimmer control circuit may receive the rectified voltage signal output from the filtering and rectifying module via the mode detecting module, determine the current operating mode of the dimmer according to the rectified voltage signal, and generate the dimmer control signal according to the current operating mode of the dimmer to control the dimmer switching module to turn on or off at the right time, thus ensuring the normal operation of the dimmer. Moreover, the dimmer control signal determines the energy provided by the switching power source, thus realizing a dimming function.

The dimmer switching module may comprise a fourth resistor and a second MOS transistor, a first terminal of the fourth resistor connects to the dimmer, a second terminal of the fourth resistor connects to a drain of the second MOS transistor, a source of the second MOS transistor is grounded, and a gate of the second MOS transistor connects to the control module.

The dimmer control circuit may further comprise a time module configured to generate a starting signal for controlling the second MSO transistor to turn on when the switching power source is powered on. Thus, the mode detecting module can detect the current operating mode of the dimmer after the switching power source is powered on, and then the dummy load control module can control the dimmer.

The mode detecting module may comprise: a first comparator in which a first input terminal of the first comparator connects to the voltage signal output from the filtering and rectifying module, and a second input terminal of the first comparator connects to a first reference voltage signal; a second comparator in which a first input terminal of the second comparator connects to the voltage signal output from the filtering and rectifying module, a second input terminal of the second comparator connects to a second reference voltage signal, and the first reference voltage signal is different from the second reference voltage signal; and a processing circuit, connected with output terminals of the first comparator and the second comparator, respectively, and configured to process signals output from the first comparator and the second comparator to output a first control signal and a processed signal, in which a second control signal is generated according to the first control signal and the processed signal, a third control signal is generated according to the first control signal and the second control signal, and one of the first control signal, the second control signal and the third control signal is valid at one time.

By setting different values of the first reference voltage signal and the second reference voltage signal, different output signals may be output from the first comparator and the second comparator, and three different control signals may be obtained after processing the different output signals of the first and second comparators by the processing circuit. Only one of the three different control signals is valid at one time and each of them is corresponding to one operating mode of the dimmer. Thus, the current operating mode of the dimmer can be detected accurately.

The control chip may further comprise a primary constant current circuit connected to the control module and the filtering and rectifying module, respectively. The primary constant current circuit may comprise: a load module connected to the control module in which the control module detects a current of the load module and generates a switching control signal according to the current of the load module; a main switching transistor connected to the control module and the load module, respectively, in which the control module controls the main switching transistor to turn on or off according to the switching control signal; a primary winding connected to the main switching transistor and configured to convert the direct current into an electromagnetic signal; an output winding configured to output the constant current according to the electromagnetic signal generated by the primary winding; and an auxiliary winding connected to the control module in which the control module detects a degaussing time of the output winding via the auxiliary winding.

The control module may further comprise a primary constant current control circuit connected to the primary constant current circuit and configured to control the primary constant current circuit to output a constant current by controlling the main switching transistor to turn on or off. The primary constant current control circuit may comprise: a primary current detecting and control module, configured to receive and sample a primary current sampling signal from the load module and generate a fourth control signal according to the primary current sampling signal; an error amplifier configured to receive the fourth control signal, to compare the fourth control signal with a fourth reference voltage signal to obtain an error signal, and to amplify the error signal to output an amplified error signal; a multiplier configured to receive the voltage signal output from the filtering and rectifying module and the amplified error signal output from the error amplifier and to output an over-current turn-off reference signal according to the voltage signal output from the filtering and rectifying module and the amplified error signal; an over-current comparator configured to receive the over-current turn-off reference signal and the primary current sampling signal and to output a fifth control signal by comparing the over-current turn-off reference signal with the primary current sampling signal in which a level of the fifth control signal turns over when a difference value between the over-current turn-off reference signal and the primary current sampling signal exceeds zero; a valley detecting module configured to detect a voltage signal of the auxiliary winding and to output a sixth control signal according to the voltage signal of the auxiliary winding in which the sixth control signal is valid when the voltage signal of the auxiliary winding reduces down to zero; a PFC logic module configured to receive the fifth control signal and the sixth control signal and to generate a seventh control signal for controlling the main switching transistor to turn on or off according to the fifth control signal and the sixth control signal.

When the voltage signal of the auxiliary winding reduces down to zero, the primary constant current control circuit may control the main switching transistor to turn on, and a current flows through the primary winding and the loading module. Then, the primary current detecting and control module samples the current and keeps the sampled value to obtain a peak envelope of the current and to simulate a voltage signal (i.e., the fourth control signal) proportional to the current value of the output winding. Subsequently, the voltage signal (the fourth control signal) and the fourth reference voltage signal are transmitted to the error amplifier and a compensation network thereof to be compared and amplified to output the amplified error signal. Then, the amplified error signal and the voltage signal output from the filtering and rectifying module are transmitted to the multiplier to output the over-current turn-off reference signal. The over-current turn-off reference signal and the primary current sampling signal are transmitted to the over-current comparator to determine the turn-off time of the main switching transistor. Therefore, the turn-on time of the main switching transistor is adjusted automatically according to the current output from the output winding, thus controlling the output current output from the primary constant current circuit to be constant.

The dummy load control module may be further configured to generate a primary constant current control signal, and the PFC logic module may be further configured to receive the primary constant current control signal and control the primary constant current control circuit to turn into dormancy according to the primary constant current control signal. Thus, energy conversation is realized.

We further provide a method of controlling a switching power source. The method may comprise: powering on the switching power source; detecting a current operating mode of the dimmer; generating a dimmer control signal according to the current operating mode and controlling the dimmer switching module to turn on or off according to the dimmer control signal to control the dimmer to enter a desired operating mode; and controlling the primary constant current circuit to output a constant current.

Controlling the primary constant current circuit to output a constant current may comprise: turning on the main switching transistor to make the primary winding and the load module work; detecting a primary current sampling signal from the load module and generating a fourth control signal according to the primary current sampling signal; comparing the fourth control signal with a fourth reference voltage signal to obtain an error signal and amplifying the error signal to obtain an amplified error signal; processing a voltage signal output from the filtering and rectifying module and the amplified error signal to generate an over-current turn-off reference signal; comparing the over-current turn-off reference signal to the primary current sampling signal to generate a fifth control signal in which a level of the fifth control signal turns over when a difference value between the over-current turn-off reference signal and the primary current sampling signal exceeds zero; detecting a voltage signal of the auxiliary winding and generating a sixth control signal according to the voltage signal of the second winding in which the sixth control signal is valid when the signal of the auxiliary winding reduces down to zero; generating a seventh control signal according to the fifth control signal and the sixth control signal, and controlling the main switching transistor to turn on or off according to the seventh control signal.

The method of controlling the switching power source can detect the current operating mode of the dimmer accurately and output corresponding control signals according to different current operating modes, which makes the control chip suitable for the dimmer having a plurality of operating modes, thus making the switching power source simple and saving resources. Furthermore, the method can control the operation of the dimmer by using a simple dimmer switching module with a simple circuit, thus reducing the cost. Moreover, the method adjusts the turn-on time of the primary constant current circuit automatically according to the output current of the output winding, thus keeping the output current constant, reliable and stable.

Reference will be made in detail to selected, representative examples. The same or similar elements and the elements having same or similar functions are denoted by like reference numerals throughout the descriptions. The examples described herein with reference to drawings are explanatory, illustrative, and used to generally understand the disclosure. The examples shall not be construed to limit the disclosure.

In the specification, unless specified or limited otherwise, relative terms such as "central," "longitudinal," "lateral," "front," "rear," "right," "left," "inner," "encasing," "lower," "upper," "horizontal," "vertical," "above," "below," "up," "top," "bottom" as well as derivative thereof (e.g., "horizontally," "downwardly," "upwardly," and the like) should be construed to refer to the orientation as then described or as shown in the drawings under discussion. These relative terms are for convenience of description and do not require that the disclosure be constructed or operated in a particular orientation.

Unless specified or limited otherwise, it should be noted that, terms "mounted," "connected," "connects," "coupled" and "fastened" may be understood broadly such as permanent connection or detachable connection, electronic connection or mechanical connection, direct connection or indirect connection via intermediary, inner communication or interaction between two elements. Those skilled in the art will understand the specific meanings according to specific situations.

Figure 2:
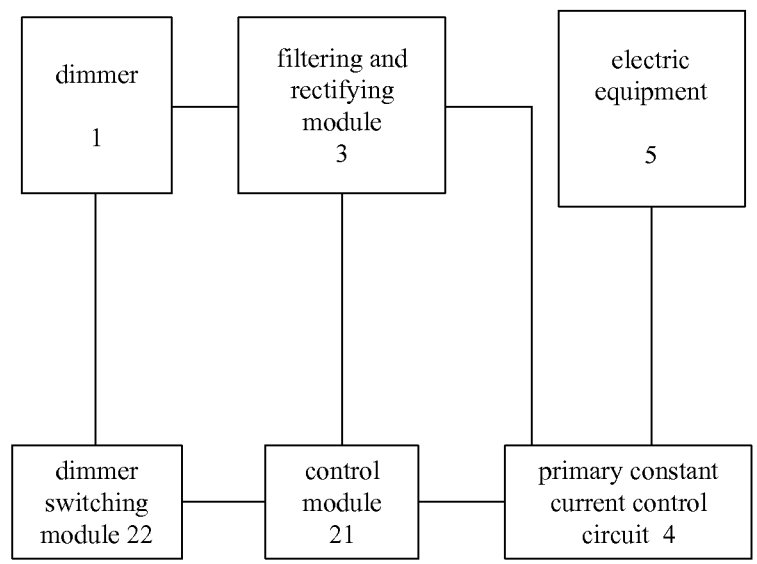
FIG. 2 is a block diagram of a switching power source according to an example.
Figure 3:
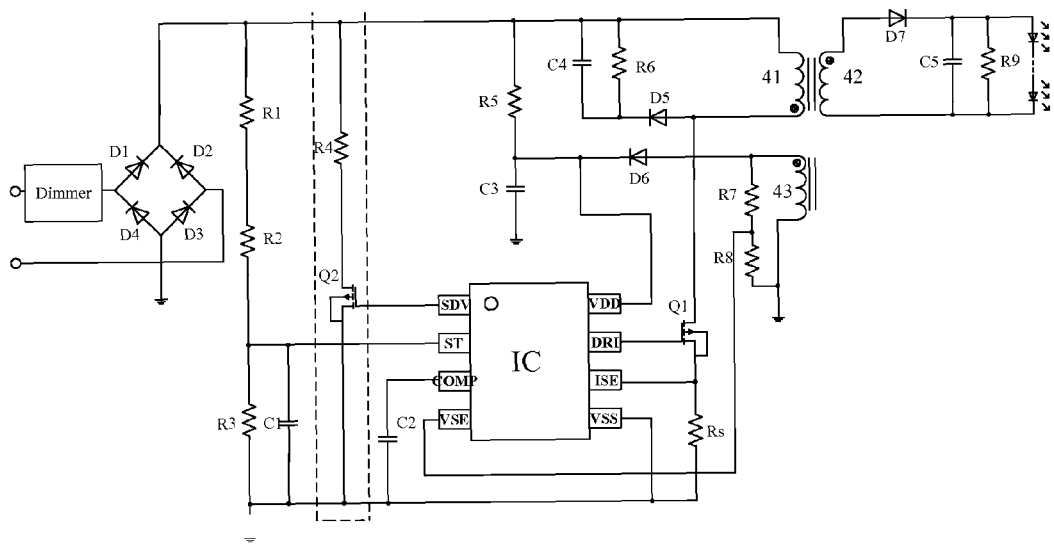
FIG. 3 is a schematic diagram illustrating a switching power source according to an example.

A switching power source is provided. As shown in FIGS. 2 and 3, the switching power source includes a dimmer 1 and a filtering and rectifying module 3. The filtering and rectifying module 3 is configured to filter an input alternating current to obtain a filtered alternating current and to rectify the filtered alternating current into a direct current. The dimmer 1 connects to the filtering and rectifying module 3 and configured to adjust a current effective value. The dimmer 1 may be located before or after the filtering and rectifying module 3. Advantageously, the dimmer 1 is located before the filtering and rectifying module 3. The dimmer 1 has a plurality of operating modes including, but not limited to, a leading mode, a trail mode and a SIN (sinusoidal) mode. The SIN mode is the operating mode in which the dimmer 1 stops adjusting the current. The switching power source further includes a control module 21, a dimmer switching module 22 and a primary constant current circuit 4. The dimmer switching module 22 connects to the control module 21 and the dimmer 1, respectively. The control module 21 controls the dimmer switching module 22 to turn on or off to control the dimmer 1 to enter a desired operating mode, and thus the dimmer 1 implements the regulating function of the current. The control module 21 connects to the dimmer 1 via the dimmer switching module 22. When the switching power source is powered on, the dimmer switching module 22 is turned on, and the control module 22 detects the current operating mode of the dimmer 1 via the dimmer switching module 22. Then, the control module 21 outputs a dimmer control signal according to the current operating mode of the dimmer 1 and controls the dimmer switching module 22 to turn on or off according to the dimmer control signal to control the dimmer 1 to enter a desired operating mode. The primary constant current circuit 4 connects to the control module 21 and the filtering and rectifying module 3, respectively, and the control module 21 controls the primary constant current circuit 4 to output a constant current.

The dimmer switching module 22 and the primary constant current circuit 4 may be integrated in a control chip 10. In other examples, one or both of the dimmer switching module 22 and the primary constant current circuit 4 may be independent from the control chip 10.

The filtering and rectifying module 3 may include a rectifier bridge, a first resistor R1 connected to an output terminal of the rectifier bridge, and a second resistor R2 and a third resistor R3 connected in series to the first resistor R1. A first terminal of the third resistor R3 connects to a line voltage waveform detecting terminal ST of the control module 21, and a second terminal of the third resistor R3 is grounded. A first capacitor C1 connects in parallel to the third resistor R3 for filtering.

The dimmer switching module 22 may include a fourth resistor R4 and a second MOS transistor Q2. A first terminal of the fourth resistor R4 connects to the dimmer 1, a second terminal of the fourth resistor R4 connects to a drain of the second MOS transistor Q2, a source of the second MOS transistor Q2 is grounded, and a gate of the second MOS transistor Q2 connects to a dummy load drive control terminal SDV of the control module 21. In this example, a NMOS transistor is taken as an example of the second MOS transistor for explanation. If the second MOS transistor Q2 is a PMOS transistor, a drain of the second MOS transistor Q2 is grounded, and a source of the second MOS transistor Q2 connects to the fourth resistor R4.

The dimmer switching module 22 may adopt only one resistor R4 and one MOS transistor Q2 to ensure normal operation of the dimmer 1. Compared to the related art that controls a turn-on time of the dimmer by a complex peripheral circuit, the dimmer switching module 22 that controls the turn-on time of the dimmer is simpler, thus reducing a manufacturing cost of the switching power source.

The control module 21 may detect the current operating mode of the dimmer 1, and then outputs the control signal via the dummy load drive control terminal SDV to control the second MOS transistor Q2 to turn on or off to place the fourth resistor R4 in the circuit at a right time to control the dimmer 1 to operate normally, thus implementing the single-stage PFC (Power Factor Correction) constant current dimming function. It should be noted that, it may also be used for non-dimming solutions in which the switching power source may not include the dimmer 1 or may include a dimmer without the function of adjusting the current, the fourth resistor R4 and the second MOS transistor Q2 are omitted, and the dummy load drive control terminal SDV is suspended.

The primary constant current circuit 4 may include a primary winding 41, a main switching transistor Q1, a load module, an output winding 42 and an auxiliary winding 43. The load module and the main switching transistor Q1 connect to the control module 21, respectively. The main switching transistor Q1 connects to a main switching transistor control terminal DRI of the control module 21. The control module 21 generates a switching control signal by detecting the current of the load module and controls the main switching transistor Q1 to turn on or off via the main switching transistor control terminal DRI. When the main switching transistor Q1 is turned on, the primary winding 41 converts the direct current output from the filtering and rectifying module 3 into an electromagnetic signal. When the main switching transistor Q1 is turned off, the output winding 42 is configured to output the constant current according to the electromagnetic signal generated by the primary winding 41. The auxiliary winding 43 connects to a feedback voltage detecting terminal VSE of the control module 21. When the main switching transistor Q1 is turned off, the control module 21 detects a degaussing time of the output winding 42 via the auxiliary winding 43. The primary constant current circuit 4 can output the constant current under a control of the control module 21.

Preferably, as shown in FIG. 3, the load module is a resistor Rs, a first terminal of the resistor Rs connects to a source of the main switching transistor Q1, and a second terminal of the resistor Rs is grounded. A gate of the main switching transistor Q1 connects to the main switching transistor control terminal DRI, a drain of the main switching transistor Q1 connects to a first terminal of the primary winding 41, and a second terminal of the primary winding 41 connects to the dimmer 1. The output winding 42 connects to a LED array. A first terminal of the auxiliary winding 43 is grounded, and a second terminal of the auxiliary winding 43 is grounded via a seventh resistor R7 and an eighth resistor R8 connected in series with the seventh resistor R7. A node between the seventh resistor R7 and the eighth resistor R8 connects to the feedback voltage detecting terminal VSE.

The auxiliary winding 43 may connect to a chip power source terminal VDD via a sixth diode D6 to provide power to the control module 21. An output terminal of the sixth diode D6 connects to the dimmer 1 via a fifth resistor R5, and the output terminal of the sixth diode D6 is also grounded via the third capacitor C3. A current output terminal of the primary winding 41 connects to a fifth diode D5, and a sixth resistor R6 and a fourth capacitor C4 connect in parallel between an output terminal of the fifth diode D5 and a current input terminal of the primary winding 41. An output terminal of the output winding 42 connects to a seventh diode D7, and a ninth resistor R9 and a fifth capacitor C5 connect in parallel between an output terminal of the seventh diode D7 and an output terminal of the output winding 42.

The switching power source can detect the current operating mode of the dimmer 1 and output the dimmer control signal according to the current operating mode. Thus, various dimmers 1 can be adopted, which facilitates constructing the power source. The turn-on time of the primary constant current circuit 4 can be adjusted automatically according to the output current, thus outputting a constant current. Moreover, the dimmer switching module 22 is simple in structure, thus reducing the manufacturing cost.

We further provide a control chip 10. The control chip 10 may include a control module 21 and a dimmer switching module 22. The dimmer switching module 22 connects to the dimmer 1 and the control module 21, respectively. The control module 21 controls operation of the dimmer 1 by controlling the dimmer switching module 22 to turn on or off, such that the dimmer 1 realizes the current regulation function.

The control chip 10 may further include the primary constant current circuit 4, and the control module 21 may further include a primary constant current control circuit

200. The primary constant current control circuit 200 connects to the primary constant current circuit 4, and configured to control the primary constant current circuit 4 to turn on or off according to the current in the primary constant current circuit 4 to control the primary constant current circuit 4 to output the constant current.

Pins of the control module 21 are described as the following Table 1.

TABLE 1 pins of the control module

| Pin symbol | Name and function |
| --- | --- |
| SDV | dummy load drive control terminal |
| ST | line voltage waveform detecting terminal, configured to detect the current operating mode of the dimmer and connected with the inner multiplier |
| COMP | loop adjusting and compensating terminal, configured to control an accurate current of LED |
| VSE | feedback voltage detecting terminal, configured to detect a feedback voltage |
| VSS | grounding terminal |
| ISE | primary current detecting terminal, configured to detect a primary current |
| DRI | main switching transistor control terminal |
| VDD | chip power source terminal |

Figure 4:
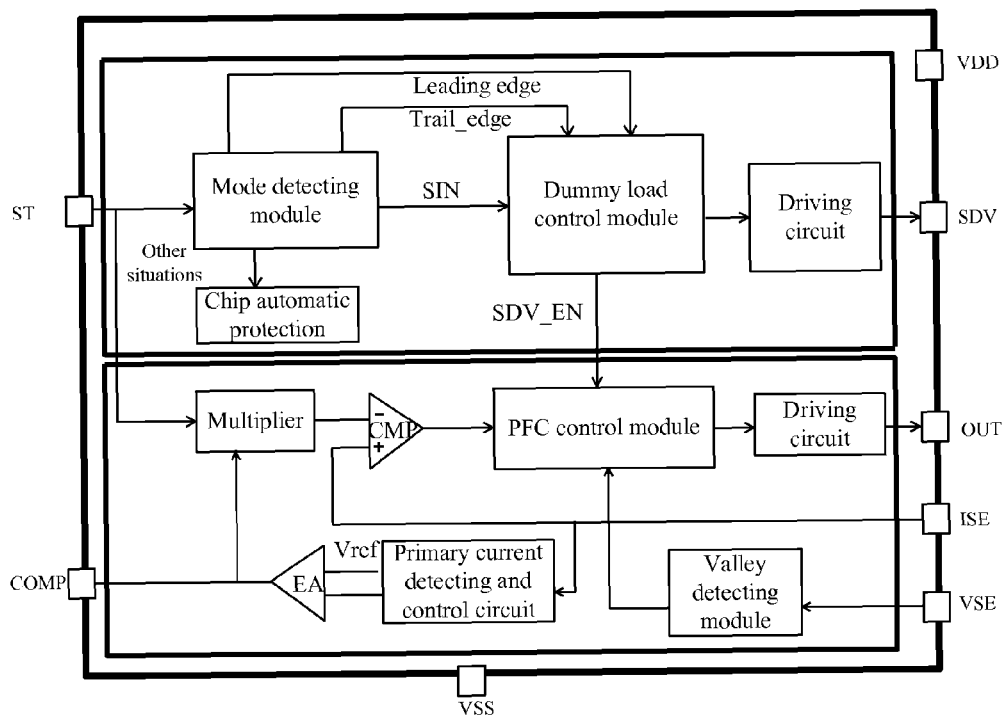
FIG. 4 is a schematic diagram of a control module according to an example.
Figure 5:
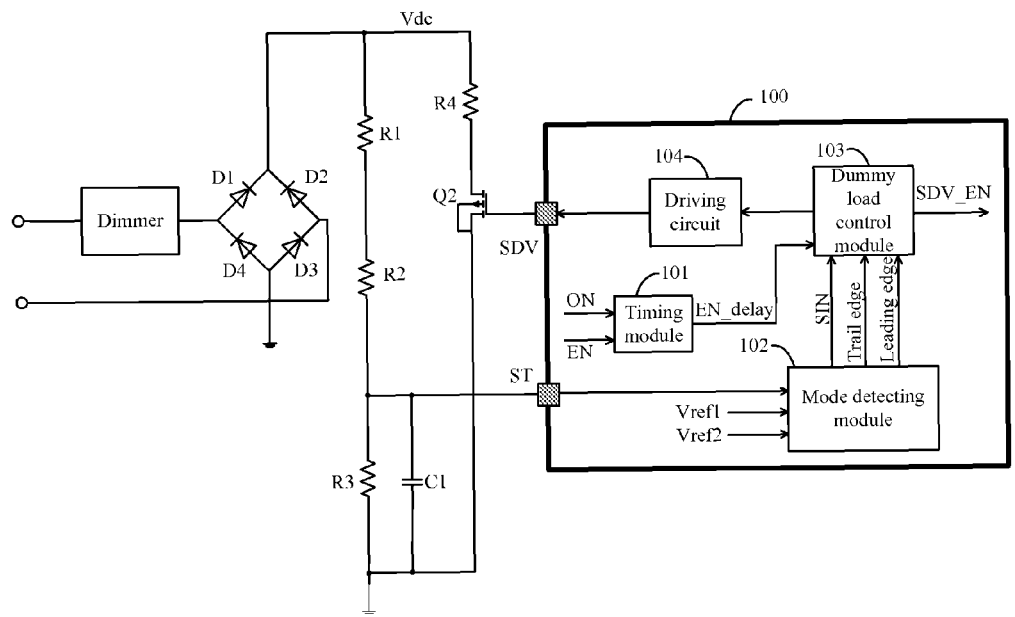
FIG. 5 is a schematic diagram of a dimmer control circuit according to an example.

As shown in FIGS. 4 and 5, the control module 21 includes a dimmer control circuit 100 and the primary constant current control circuit 200. The dimmer control circuit 100 includes a mode detecting module 102 and a dummy load control module 103. The mode detecting module 102 connects to the filtering and rectifying module 3 and is configured to receive the voltage signal output from the filtering and rectifying module 3, to determine the waveform type of the voltage signal, detect the current operating mode of the dimmer 1, generate a mode control signal according to the current operating mode of the dimmer 1 and transmit the mode control signal to the dummy load control module 103. The dummy load control module 103 connects to the mode detecting module 102 and the filtering and rectifying module 3, respectively and configured to receive the voltage signal output from the filtering and rectifying module 3 and the mode control signal output from the mode detecting module 102, and to generate the dimmer control signal SDV and a primary constant current control signal SDV_EN.

The dimmer control circuit 100 of the control module 21 may determine the current operating mode of the dimmer 1 by receiving the following voltage of the line voltage (i.e., the rectified voltage signal output from the filtering and rectifying module 3) via the mode detecting module 102, and may generate the dimmer control signal to turn on or off the dimmer switching module 22 at the right time to ensure the normal operation of the dimmer 1. The dimmer control signal determines the energy provided by the switching power source, thus realizing the dimming function. Moreover, the dimmer control circuit 100 outputs the primary constant current control signal according to the dimmer control signal to control the primary constant current circuit 4 to turn into dormancy, thus saving energy.

The dimmer control circuit 100 may further comprise a timing module 101 configured to generate a starting signal that controls the second MOS transistor Q2 of the dimmer switching module 22 to turn on when the switching power source is powered on. Thus, the normal operation of the dimmer 1 is ensured, the mode detecting module 102 can detect the current operating mode of the dimmer 1, and the dummy load control module 103 can control the dimmer 1 and the primary constant current circuit 4.

Figure 6:
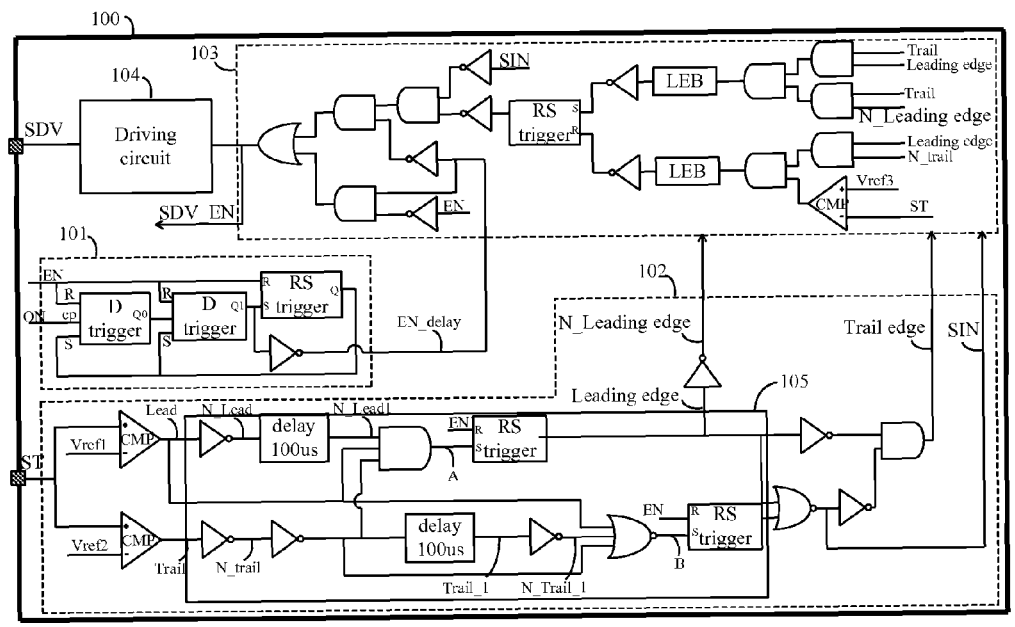
FIG. 6 is a circuit diagram of a dimmer control circuit according to an example.

As shown in FIG. 6, the mode detecting module may comprise a first comparator CMP1, a second comparator CMP2 and a processing circuit 105. A first input terminal of the first comparator CMP1 connects to the voltage signal output from the filtering and rectifying module 3, and a second input terminal of the first comparator CMP1 connects to a first reference voltage signal Vref1. A first input terminal of the second comparator CMP2 connects to the voltage signal output from the filtering and rectifying module 3, and a second input terminal of the second comparator CMP2 is connected with a second reference voltage signal Vref2. The first reference voltage signal Vref1 is different from the second reference voltage signal Vref2. The processing circuit 105 connects to output terminals of the first comparator CMP1 and the second comparator CMP2, respectively, and configured to process signals output from the first comparator CMP1 and the second comparator CMP2 to output a first control signal and a processed signal, in which a second control signal is generated according to the first control signal and the processed signal, a third control signal is generated according to the first control signal and the second control signal, and one of the first control signal, the second control signal and the third control signal is valid at one time.

By setting different values of the first reference voltage signal and the second reference voltage signal, different output signals may be output from the first comparator and the second comparator, and three different control signals may be obtained after processing the different output signals of the first and second comparators by the processing circuit 105. Only one of the three different control signals is valid at one time and each of them corresponds to one operating mode of the dimmer 1. Thus, the current operating mode of the dimmer 1 can be detected accurately.

Figure 9:
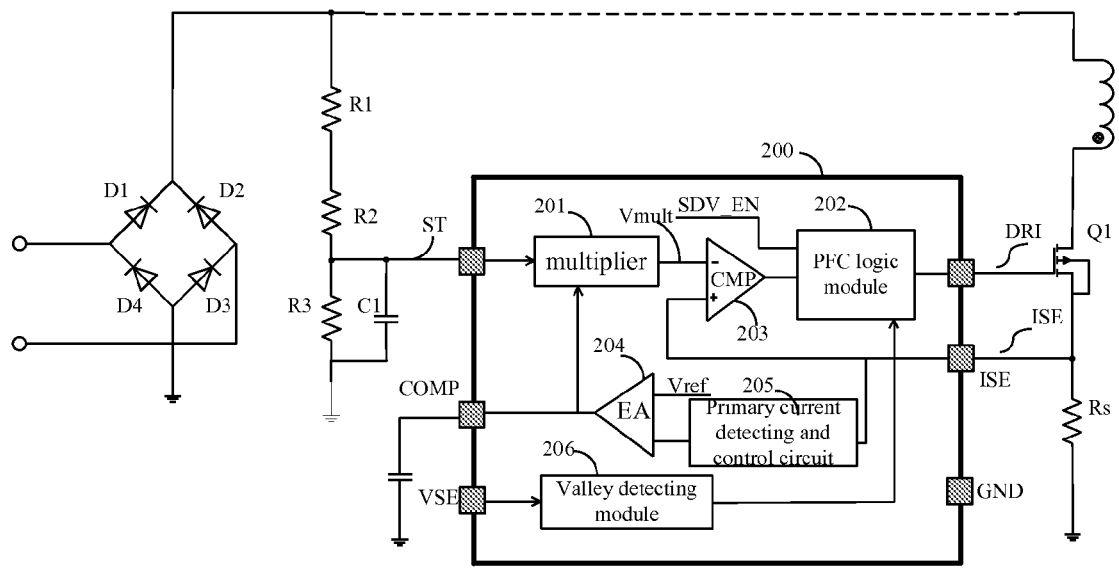
FIG. 9 is a schematic diagram of a primary constant current control circuit.

As shown in FIGS. 4 and 9, the primary constant current control circuit 200 includes a primary current detecting and control module 205, an error amplifier 204, a multiplier 201, an over-current comparator 203, a valley detecting module 206 and a PFC logic module 202. The primary current detecting and control module 205 is configured to receive and sample a primary current sampling signal from the load module, to generate a fourth control signal according to the primary current sampling signal and transmit the fourth control signal to the error amplifier 204. The error amplifier 204 is configured to receive the fourth control signal, compare the fourth control signal with a fourth reference voltage signal to obtain an error signal, and amplify the error signal to output an amplified error signal. The multiplier 201 is configured to receive the voltage signal output from the filtering and rectifying module 3 and the amplified error signal output from the error amplifier 204 and output an over-current turn-off reference signal Vmult, a waveform of which is a half-sine waveform. The over-current comparator 203 is configured to receive the over-current turn-off reference signal and the primary current sampling signal and output a fifth control signal by comparing the over-current turn-off reference signal to the primary current sampling signal. A level of the fifth control signal turns over when a difference value between the over-current turn-off reference signal and the primary current sampling signal exceeds zero. Specifically, when the primary current sampling signal rises to a value equal to the over-current turn-off reference signal Vmult, the level of the fifth control signal output from the over-current comparator 203 turns over to a high level from a low level. The valley detecting module 206 is configured to detect a voltage signal of the auxiliary winding 43 and to output a sixth control signal according to the voltage signal of the auxiliary winding 43. The sixth control signal is valid when the voltage signal of the auxiliary winding 43 reduces down to zero. The sixth control signal is valid when the level thereof is a high level. The PFC logic module 202 may be configured to receive the fifth control signal and the sixth control signal and generate a seventh control signal that controls the main switching transistor Q1 to turn on or off according to the fifth control signal and the sixth control signal.

The primary constant current control circuit 200 may work in a critical conduction mode. When the voltage signal of the auxiliary winding 43 reduces down to zero, the primary constant current control circuit 200 controls the main switching transistor Q1 to turn on, and a current flows through the primary winding 41 and the load module. Then, the primary current detecting and control module 205 samples the current and keeps the sampled value to obtain a peak envelope of the current and simulate the fourth control signal in proportion to the current value of the output winding. Subsequently, the fourth control signal and the fourth reference voltage signal Vref are transmitted to the error amplifier 204 and a compensation network thereof to be compared and amplified to output the amplified error signal. Then, the amplified error signal and the voltage signal output from the filtering and rectifying module 3 are transmitted to the multiplier 201 to output the over-current turn-off reference signal Vmult. The over-current turn-off reference signal Vmult and the primary current sampling signal are transmitted to the over-current comparator 203 to determine the turn-off time of the main switching transistor Q1. Therefore, the turn-on time of the main switching transistor Q1 is automatically adjusted according to the current output from the output winding 42, thus controlling the current output from the primary constant current circuit 4 to be constant.

The PFC logic module 202 may be further configured to receive the primary constant current control signal, and control the primary constant current control circuit 4 to turn into dormancy according to the primary constant current control signal, thus saving energy. The primary constant current control signal determines the energy provided by the switching power source, thus realizing the dimming function.

We still further provide methods of controlling the switching power source and the methods may include the following steps.

At step 1, the dimmer switching module 22 is turned on for a preset time T, and the mode detecting module 102 detects the current operating mode of the dimmer 1 and generates a mode control signal. The time T may be set by the timing module 101. The timing module 101 generates a starting signal for controlling the second MOS transistor Q2 to turn on during the preset time T after the switching power source is turned on, thus controlling the dimmer 1 to work.

At step 2, the dummy load control module 103 generates a dimmer control signal and a primary constant current control signal according to the mode control signal, and controls the dimmer switching module 22 to turn on or off according to the dimmer control signal.

At step 3, the main switching transistor Q1 is turned on to make the primary winding 41 and the load module work. Once the mode detecting module 102 detects the current operating mode of the dimmer 1, the PFC logic module 202 may control the main switching transistor Q1 to turn on for the first time to make the primary winding 41 and the load module work, thus improving the response speed of the circuit.

At step 4, the primary current detecting and control module 205 detects the primary current sampling signal from the load module and generates the fourth control signal according to the primary current sampling signal.

At step 5, the error amplifier 204 compares the fourth control signal with the fourth reference voltage signal to obtain an error signal and amplifies the error signal to obtain an amplified error signal.

At step 6, the multiplier 201 processes the voltage signal output from the filtering and rectifying module 3 and the amplified error signal output from the error amplifier 204 to generate the over-current turn-off reference signal.

At step 7, the over-current comparator 203 compares the over-current turn-off reference signal to the primary current sampling signal to generate the fifth control signal. The level of the fifth control signal turns over when the difference value between the over-current turn-off reference signal and the primary current sampling signal exceeds zero.

At step 8, the valley detecting module 206 detects the voltage signal of the auxiliary winding 43 and generates the sixth control signal according to the voltage signal of the auxiliary winding 43. The sixth control signal is valid when the voltage signal of the auxiliary winding 43 reduces down to zero.

At step 9, the PFC logic module 202 generates the seventh control signal according to the fifth control signal and the sixth control signal, and controls the main switching transistor Q1 to turn on or off according to the seventh control signal.

The method of controlling the switching power source can detect the current operating mode of the dimmer 1 accurately and can output corresponding control signals according to different operating modes, which makes the control chip 10 suitable for the dimmer 1 having a plurality of current operating modes, thus making the switching power source simple and saving resources. Furthermore, the method can control operation of the dimmer 1 by using a simple dimmer switching module with a simple circuit, thus reducing the cost. Moreover, the method adjusts the turn-on time of the primary constant current circuit 4 automatically according to the output current of the output winding 42, thus keeping the output current constant, reliable and stable.

In the following, the structure and the operating process of the switching power source will be described in detail.

Figure 7:
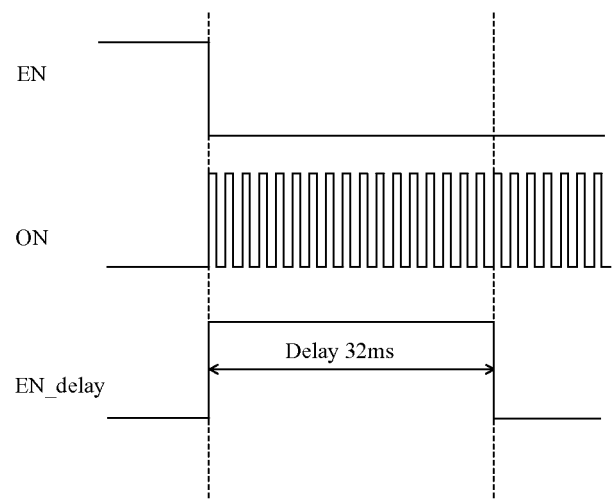
FIG. 7 is a schematic diagram illustrating signal waveforms of a timing module shown in FIG. 6.

As shown in FIG. 6, when the system is powered on, a voltage of the chip power source terminal VDD reaches a starting threshold and generates an enabling signal EN. At the same time, the valley detecting module 206 detects a valley of the degaussing signal of the output winding 42, and the PFC logic module 202 generates a periodic starting signal for the main switching transistor Q1. After processing the periodic starting signal, a rising edge of the periodic starting signal is obtained to generate a pulse signal ON with a fixed cycle. The timing module 101 receives the enabling signal EN and the pulse signal ON with the fixed cycle and generates a primary starting signal EN_delay having an effective pulse time T. The timing module 101 may include D triggers and a RS trigger, and the preset time of the timing module 101 may be determined by the number of D triggers and the frequency of the pulse signal ON. In other words, the larger the number of D triggers is and the lower the frequency of the pulse signal ON is, the longer the preset time is. The number of D triggers may be 12 (not all the D triggers are shown in the drawings), the pulse signal ON is a square wave having a frequency of 60 KHZ and a duty ratio of 8%, and the preset time is 32 ms, as shown in FIG. 7. The primary starting signal EN_delay is kept at a high level for a time T to turn on the second MOS transistor Q2 and place the fourth resistor R4 in the circuit, thus ensuring normal operation of the dimmer 1, such that the operating mode of the dimmer 1 can be detected and controlled.

As shown in FIG. 6, the mode detecting module comprises a first comparator CMP1, a second comparator CMP2 and a processing circuit 105. The first input terminal of the first comparator CMP1 connects to the voltage signal output from the filtering and rectifying module 3, and a second input terminal of the first comparator CMP1 connects to a first reference voltage signal Vref1. A first input terminal of the second comparator CMP2 connects to the voltage signal output from the filtering and rectifying module 3, and a second input terminal of the second comparator CMP2 connects to a second reference voltage signal Vref2. The voltage signal output from the filtering and rectifying module 3 is input to the first and second comparators CMP1, CMP2 via the line voltage waveform detecting terminal ST, and the first reference voltage signal Vref1 is different from the second reference voltage signal Vref2. The first reference voltage signal Vref1 may be less than the second reference voltage signal Vref2. The first reference voltage signal Vref1 may also be 0.5V, and the second reference voltage signal Vref2 may be 0.8V.

The output signals of the first and second comparators CMP1, CMP2 are processed by delayers, gate circuits and triggers in the processing circuit 105 to obtain the first, second and third control signals, of which only one is valid at one time. Specifically, the first comparator CMP1 generates a square wave pulse signal Lead and the second comparator CMP2 generates a square wave pulse signal Trail different from the square wave pulse signal Lead. Then, the square wave pulse signals Lead and Trail are inverted by inverters to obtain square wave pulse signals N_Lead and N_Trail, respectively. The square wave pulse signal N_Lead is processed by the delayer to obtain a square wave pulse signal N_Lead1, and the square wave pulse signal N_Lead1, the square wave pulse signal Lead and the square wave pulse signal N_Trail are processed by an AND gate to obtain a triggering voltage pulse signal A. The square wave pulse signal N_Trail is processed by the delayer to obtain a square wave pulse signal Trail_1, the square wave pulse signal Trail_1 is inverted to obtain a square wave pulse signal N_Trail_1, and the square wave pulse signal N_Lead, the square wave pulse signal N_Trail and the square wave pulse signal N_Trail_1 are processed by a NOR gate to obtain a triggering voltage pulse signal B. The delayer may delay the signal for 100 microseconds. The triggering voltage pulse signal A may be processed by the RS trigger to obtain a logic signal leading edge (i.e., the first control signal), the triggering voltage pulse signal B may be processed by the RS trigger to obtain a processed signal, and then the first control signal and the processed signal may be processed by the NOR gate to obtain a logic signal SIN (i.e., the second control signal), the inverted first control signal and the inverted second control signal may be processed by the AND gate to obtain a logic signal Trail edge (i.e., the third control signal). At one time, only one of the first control signal, the second control signal and the third control signal is valid. Furthermore, logic values formed by the first control signal, the second control signal and the third control signal indicate different operating modes of the dimmer 1, and the logic values are shown in Table 2.

TABLE 2 logic values corresponding to the operating modes of the dimmer 1

| first control signal | third control signal | second control signal | operating mode of dimmer |
|---|---|---|---|
| 1 | 0 | 0 | Leading mode |
| 0 | 1 | 0 | Trail mode |
| 0 | 0 | 1 | SIN mode |

Figure 8:
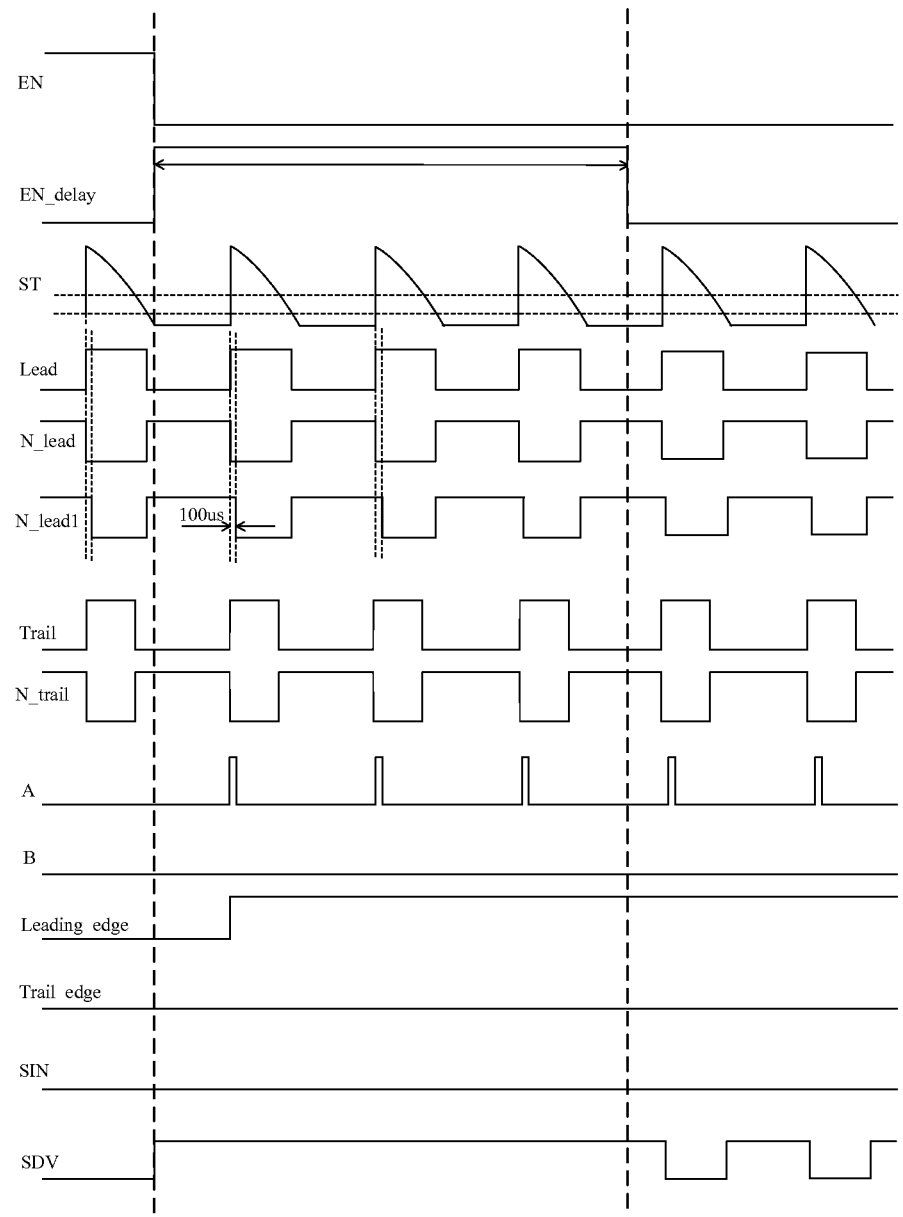
FIG. 8 is a schematic diagram illustrating signal waveforms of the dimmer control circuit shown in FIG. 6 in a leading mode.

It should be noted that, when the logic value indicates that the current operating mode of the dimmer 1 is the SIN mode, it means that the switching power source does not include the dimmer 1 or the dimmer 1 in the switching power source cannot adjust the voltage. In addition, FIG. 8 is a schematic diagram illustrating signal waveforms of the dimmer 1 in the leading mode.

The dummy load control module 103 receives the signal output from the mode detecting module 102 and processes the signal by the gate circuits and triggers therein to generate the dimmer control signal to control the second MOS transistor Q2 to turn on or off. When the current operating mode of the dimmer 1 is the leading mode, the dummy load control module 103 will detect the line voltage waveform output from the filtering and rectifying module 3. When the line voltage value output from the filtering and rectifying module 3 is greater than the second reference voltage signal Vref2, the dummy load drive control terminal SDV outputs a low level; and when the line voltage value output from the filtering and rectifying module 3 is less than the second reference voltage signal Vref2, the dummy load drive control terminal SDV outputs a high level. When the current operating mode of the dimmer 1 is the trail mode, the dummy load drive control terminal SDV outputs a low level when the line voltage value output from the filtering and rectifying module 3 is greater than the second reference voltage signal Vref2. Furthermore, the line voltage value output from the filtering and rectifying module 3 is compared to the third reference voltage signal Vref3, and when the line voltage value output from the filtering and rectifying module 3 is less than the third reference voltage signal Vref3, the dummy load drive control terminal SDV outputs a high level. When the SIN mode is detected, i.e., when the switching power source does not include the dimmer 1 or the dimmer 1 does not work, the dummy load drive control terminal SDV outputs a low level, and the second MOS transistor Q2 and the fourth resistor R4 may be omitted. The primary constant current control signal SDV_EN generated by the dummy load control module 103 is a square wave pulse signal following the signal output from the dummy load drive control terminal SDV, and the high level duration of the primary constant current control signal SDV_EN determines the energy provided by the primary constant current circuit.

The high level may be a valid level, and voltage waveforms of the dimmer control signal SDV and the primary constant current control signal SDV_EN may have a same period as that of the line voltage output from the filtering and rectifying module 3. Further, the low level duration of the dimmer control signal SDV reflects a conduction angle value of the dimmer 1, and the primary constant current control circuit 200 is in a dormancy state during high level duration of the primary constant current control SDV_EN.

The dimmer control circuit 100 may further include a driving circuit 104. The driving circuit 104 may adopt a push-pull structure.

Figure 11:
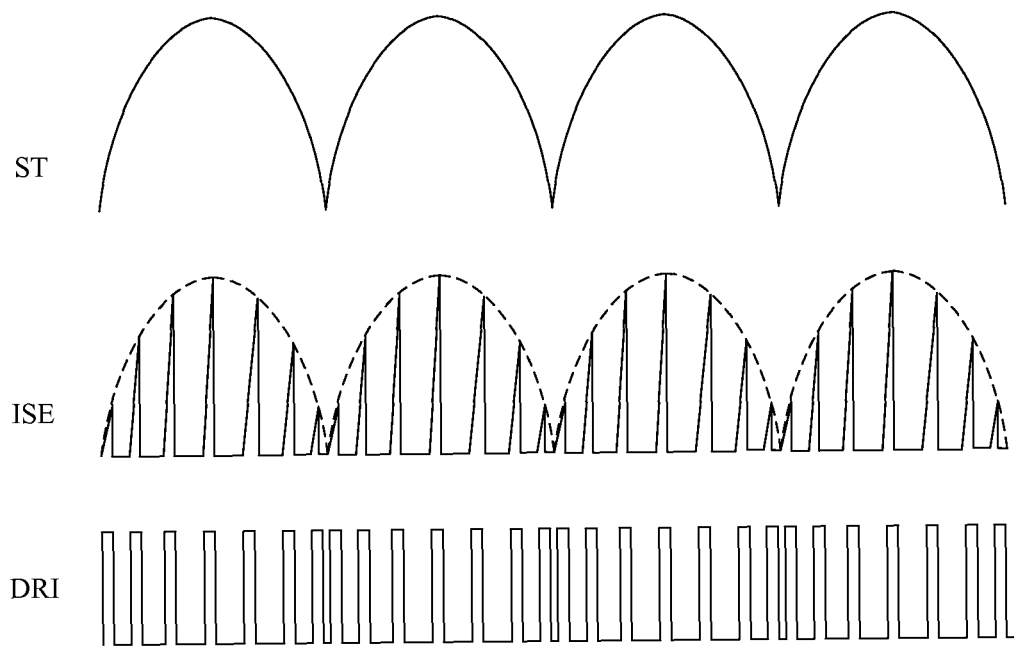
FIG. 11 is a schematic diagram illustrating signal waveforms of the primary constant current control circuit shown in FIG. 9 when the dimmer is in a SIN mode.
Figure 12:
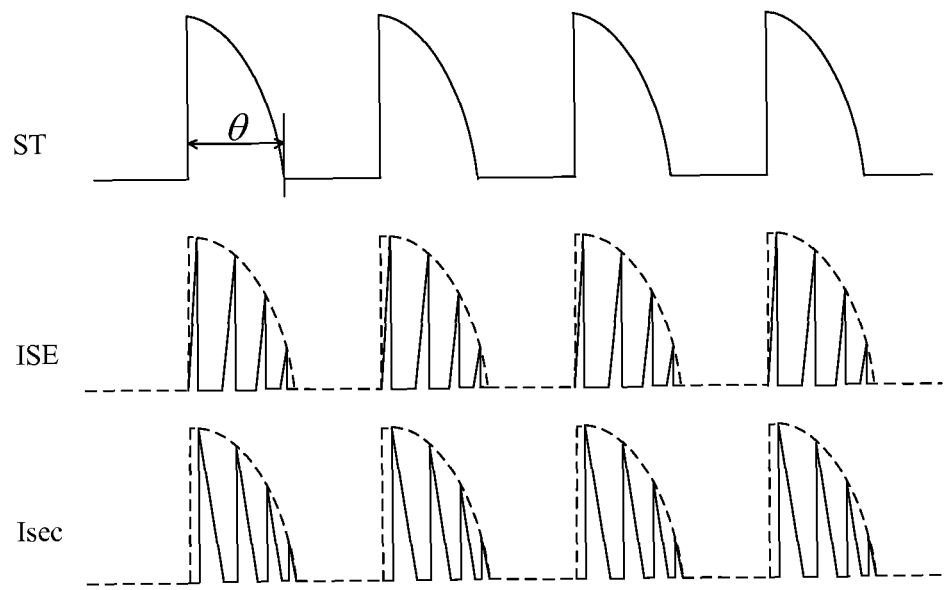
FIG. 12 is a schematic diagram illustrating signal waveforms of the primary constant current control circuit shown in FIG. 9 when the dimmer is in a leading mode.

FIG. 9 is a schematic diagram of the primary constant current control circuit 200. As shown in FIG. 9, when the mode detecting mode 102 determines the current operating mode of the dimmer 1, the PFC logic module 202 starts to work, and generates a high level to turn on the main switching transistor Q1, the current in the primary winding 41 increases to form a voltage drop (i.e., the primary current waveform) in the load module Rs. FIG. 11 is a schematic diagram illustrating current waveforms of the primary constant current control circuit 200 when the dimmer 1 is in the SIN mode. FIG. 12 is a schematic diagram illustrating current waveforms of the primary constant current control circuit 200 when the dimmer 1 is in the leading mode. The primary current waveform is sampled by the primary current detecting and control module 205 to obtain the primary current sampling signal, the primary current sampling signal is processed by the error amplifier 204 to obtain the amplified error signal, and then the amplified error signal is transmitted to the multiplier 201 together with the voltage signal (e.g., the line voltage waveform) output from the filtering and rectifying module 3. After processing the amplified error signal and the voltage signal output from the filtering and rectifying module 3 by the multiplier 201, the over-current turn-off reference signal Vmult for the main switching transistor Q1 is obtained. The over-current comparator 203 receives the over-current turn-off reference signal Vmult and the primary current sampling signal and outputs a fifth control signal by comparing the over-current turn-off reference signal Vmult with the primary current sampling signal. The level of the fifth control signal turns over when a difference value between the over-current turn-off reference signal Vmult and the primary current sampling signal exceeds zero. Specifically, when the primary current sampling signal is greater than the over-current turn-off reference signal Vmult, the fifth control signal output from the over-current comparator 203 turns over to a high level; when the primary current sampling signal is less than the over-current turn-off reference signal Vmult, the fifth control signal output from the over-current comparator 203 turns over to a low level.

Figure 10:
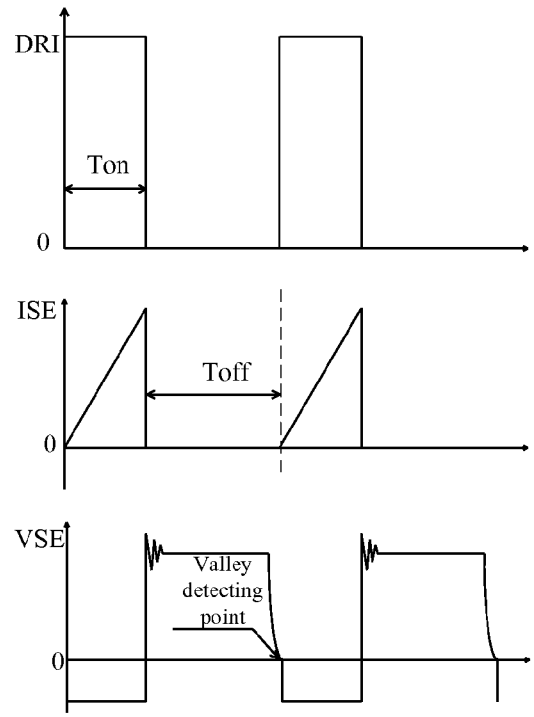
FIG. 10 is a schematic diagram illustrating signal waveforms of a valley detecting module shown in FIG. 9.

The PFC logic module 202 receives the fifth control signal output from the over-current comparator 203 and generates a seventh control signal for controlling the main switching transistor Q1 to turn on or off after logic processing. When the main switching transistor Q1 is turned off, the energy stored in an inductor of the primary winding 41 will be consumed by a loop formed by an inductor of the output winding 42, the seventh diode D7 and the LED load. At the same time, the valley detecting module 206 detects the degaussing time of the inductor of the output winding 42 via the auxiliary winding 43, and the auxiliary winding 43 also provides power for the chip power source terminal VDD of the chip. Once the valley detecting model 206 detects that the degaussing of the output winding 42 ends, i.e., the feedback voltage detecting terminal VSE detects the valley of the voltage waveform, i.e., when the voltage signal of the auxiliary winding 43 reduces down to zero, the sixth control signal is output as a valid signal. As shown in FIG. 10, the sixth control signal will be transmitted to the PFC logic module 202 to form the starting signal of the main switching transistor Q1, and that cycle repeats to ensure the energy transfer and consumption of the whole system.

The primary current detecting and control module 205 may simulate the secondary current in the output winding 42 and generate the fourth control signal to be compared with the fourth reference voltage signal Vref, such that the current output from the output winding 42 can be kept constant by adjusting the over-current turn-off reference signal Vmult automatically when the input or output condition of the switching power source changes.

Reference to "another example," "an example," "a specific example," or "some examples," means that a particular feature, structure, material, or characteristic described in connection with the example is included in at least one example. Thus, the appearances of the phrases such as "in another example," "in an example," "in a specific example," or "in some examples," in various places throughout this specification are not necessarily referring to the same example. Furthermore, the particular features, structures, materials, or characteristics may be combined in any suitable manner in one or more examples.

Although explanatory examples have been shown and described, it would be appreciated by those skilled in the art that the above examples can not be construed to limit the disclosure, and changes, alternatives, and modifications can be made in the examples without departing from spirit, principles and scope of this disclosure.

What is claimed is:

1. A switching power source, comprising:
   a dimmer connected to an alternating current power supply and having a plurality of operating modes;
   a filtering and rectifying module connected to the dimmer and configured to filter an alternating current output from the dimmer to obtain a filtered alternating current and rectify the filtered alternating current into a direct current;
   a dimmer switching module connected to the dimmer;
   a control module connected to the filtering and rectifying module and the dimmer switching module respectively, and configured to detect a current operating mode of the dimmer when the switching power source is powered on, to generate a dimmer control signal according to the current operating mode, and to control the dimmer switching module to turn on or off according to the dimmer control signal to control the dimmer to enter a desired operating mode; and
   a primary constant current circuit connected to the control module and the filtering and rectifying module, respectively, wherein the control module controls the primary constant current circuit to output a constant current.

2. The switching power source according to claim 1, wherein the dimmer switching module comprises a fourth resistor and a second MOS transistor, a first terminal of the fourth resistor connects to the dimmer, a second terminal of the fourth resistor connects to a drain of the second MOS transistor, a source of the second MOS transistor is grounded, and a gate of the second MOS transistor connects to the control module.

3. The switching power source according to claim 2, wherein the dimmer control circuit further comprises a timing module configured to generate a starting signal that controls the second MOS transistor to turn on when the switching power source is powered on.

4. The switching power source according to claim 1, wherein the primary constant current circuit comprises:
   a load module connected to the control module in which the control module detects a current of the load module and generates a switching control signal according to the current of the load module;
   a main switching transistor connected to the control module and the load module respectively, in which the control module controls the main switching transistor to turn on or off according to the switching control signal;

a primary winding, connected to the main switching transistor and configured to convert the direct current into an electromagnetic signal;

an output winding configured to output the constant current according to the electromagnetic signal generated by the primary winding; and an auxiliary winding connected to the control module, in which the control module detects a degaussing time of the output winding via the auxiliary winding.

5. The switching power source according to claim 1, wherein the control module comprises a dimmer control circuit and the dimmer control circuit comprises:

a mode detecting module connected to the filtering and rectifying module, and configured to receive a voltage signal output from the filtering and rectifying module, to detect the current operating mode of the dimmer according to the voltage signal, and to generate a mode control signal according to the current operating mode of the dimmer; and a dummy load control module connected to the mode detecting module and the filtering and rectifying module respectively, and configured to receive the voltage signal output from the filtering and rectifying module and the mode control signal output from the mode detecting module, and generate the dimmer control signal and a primary constant current control signal.

6. The switching power source according to claim 5, wherein the mode detecting module comprises:

a first comparator, in which a first input terminal of the first comparator connects to the voltage signal output from the filtering and rectifying module, and a second input terminal of the first comparator is connected with a first reference voltage signal;

a second comparator in which a first input terminal of the second comparator connects to the voltage signal output from the filtering and rectifying module, a second input terminal of the second comparator is connected with a second reference voltage signal, and the first reference voltage signal is different from the second reference voltage signal; and a processing circuit connected to output terminals of the first comparator and the second comparator, respectively, and configured to process signals output from the first comparator and the second comparator to output a first control signal and a processed signal, in which a second control signal is generated according to the first control signal and the processed signal, a third control signal is generated according to the first control signal and the second control signal, and one of the first control signal, the second control signal and the third control signal is valid at one time.

7. The switching power source according to claim 1, wherein the control module further comprises a primary constant current control circuit and the primary constant current control circuit comprises:

a primary current detecting and control module configured to receive and sample a primary current sampling signal from the load module and generate a fourth control signal according to the primary current sampling signal;

an error amplifier configured to receive the fourth control signal, to compare the fourth control signal with a fourth reference voltage signal to obtain an error signal, and amplify the error signal to output an amplified error signal;

a multiplier, configured to receive the voltage signal output from the filtering and rectifying module and the amplified error signal output from the error amplifier and to output an over-current turn-off reference signal according to the voltage signal output from the filtering and rectifying module and the amplified error signal;

an over-current comparator configured to receive the over-current turn-off reference signal and the primary current sampling signal and to output a fifth control signal by comparing the over-current turn-off reference signal to the primary current sampling signal, in which a level of the fifth control signal turns over when a difference value between the over-current turn-off reference signal and the primary current sampling signal exceeds zero;

a valley detecting module, configured to detect a voltage signal of the auxiliary winding and to output a sixth control signal according to the voltage signal of the auxiliary winding, in which the sixth control signal is valid when the voltage signal of the auxiliary winding reduces down to zero; and a PFC logic module, configured to receive the fifth control signal and the sixth control signal and generate a seventh control signal that controls the main switching transistor to turn on or off according to the fifth control signal and the sixth control signal.

8. The switching power source according to claim 7, wherein the PFC logic module is further configured to receive the primary constant current control signal, and control the primary constant current control circuit to turn into dormancy according to the primary constant current control signal.

9. A method of controlling a switching power source, wherein the switching power source comprises a dimmer connected to an alternating current power supply and having a plurality of operating modes; a filtering and rectifying module connected to the dimmer and configured to filter an alternating current output from the dimmer to obtain a filtered alternating current and rectify the filtered alternating current into a direct current; a dimmer switching module connected to the dimmer; and a primary constant current circuit connected to the filtering and rectifying module, the method comprising:

powering on the switching power source;

detecting a current operating mode of the dimmer;

generating a dimmer control signal according to the current operating mode and controlling the dimmer switching module to turn on or off according to the dimmer control signal to control the dimmer to enter a desired operating mode; and controlling the primary constant current circuit to output a constant current.

10. The method according to claim 9, wherein the primary constant current circuit comprises a load module, a main switching transistor connected to the load module, a primary winding connected to the main switching transistor, an output winding and an auxiliary winding, and controlling the primary constant current circuit to output a constant current comprises:

turning on the main switching transistor to make the primary winding and the load module work;

detecting a primary current sampling signal from the load module and generating a fourth control signal according to the primary current sampling signal;

comparing the fourth control signal with a fourth reference voltage signal to obtain an error signal and amplifying the error signal to obtain an amplified error signal;

processing a voltage signal output from the filtering and rectifying module and the amplified error signal to generate an over-current turn-off reference signal;

comparing the over-current turn-off reference signal with the primary current sampling signal to generate a fifth control signal, in which a level of the fifth control signal turns over when a difference value between the over-current turn-off reference signal and the primary current sampling signal exceeds zero;

detecting a voltage signal of the auxiliary winding and generating a sixth control signal according to the voltage signal of the auxiliary winding, in which the sixth control signal is valid when the signal of the auxiliary winding reduces down to zero; and generating a seventh control signal according to the fifth control signal and the sixth control signal, and controlling the main switching transistor to turn on or off according to the seventh control signal.

11. The method according to claim 9, wherein when the switching power source is powered on, the dimmer switching module is controlled to turn on.

12. A control chip that controls a switching power source comprising a dimmer and a filtering and rectifying module, wherein the dimmer connects to an alternating current power supply and has a plurality of operating modes, the filtering and rectifying module connects to the dimmer and is configured to filter an alternating current output from the dimmer to obtain a filtered alternating current and rectify the filtered alternating current into a direct current, and the control chip comprises:

a dimmer switching module connected to the dimmer; and a control module connected to the dimmer switching module and the filtering and rectifying module, respectively, and configured to detect a current operating mode of the dimmer when the switching power source is powered on, to generate a dimmer control signal according to the current operating mode, and control the dimmer switching module to turn on or off according to the dimmer control signal to control the dimmer to enter a desired operating mode.

13. The control chip according to claim 12, wherein the dimmer switching module comprises a fourth resistor and a second MOS transistor, a first terminal of the fourth resistor connects to the dimmer, a second terminal of the fourth resistor connects to a drain of the second MOS transistor, a source of the second MOS transistor is grounded, and a gate of the second MOS transistor connects to the control module.

14. The control chip according to claim 12, wherein the control module comprises a dimmer control circuit and the dimmer control circuit comprises:

a mode detecting module connected to the filtering and rectifying module, and configured to receive a voltage signal output from the filtering and rectifying module, to detect the current operating mode of the dimmer according to the voltage signal, and generate a mode control signal according to the current operating mode of the dimmer; and a dummy load control module connected to the mode detecting module and the filtering and rectifying module, respectively, and configured to receive the voltage signal output from the filtering and rectifying module and the mode control signal output from the mode detecting module, and generate the dimmer control signal.

15. The control chip according to claim 14, wherein the mode detecting module comprises:

a first comparator in which a first input terminal of the first comparator connects to the voltage signal output from the filtering and rectifying module, and a second input terminal of the first comparator connects to a first reference voltage signal;

a second comparator in which a first input terminal of the second comparator connects to the voltage signal output from the filtering and rectifying module, a second input terminal of the second comparator connects to a second reference voltage signal, and the first reference voltage signal is different from the second reference voltage signal; and a processing circuit connected to output terminals of the first comparator and the second comparator respectively and configured to process signals output from the first comparator and the second comparator to output a first control signal and a processed signal, in which a second control signal is generated according to the first control signal and the processed signal, a third control signal is generated according to the first control signal and the second control signal, and one of the first control signal, the second control signal and the third control signal is valid at one time.

16. The control chip according to claim 12, wherein the dimmer control circuit further comprises a timing module configured to generate a starting signal that controls the second MOS transistor to turn on when the switching power source is powered on.

17. The control chip according to claim 12, further comprising a primary constant current circuit connected to the control module and the filtering and rectifying module respectively, and the primary constant current circuit comprises:

a load module connected to the control module in which the control module detects a current of the load module and generates a switching control signal according to the current of the load module;

a main switching transistor connected to the control module and the load module, respectively, in which the control module controls the main switching transistor to turn on or off according to the switching control signal;

a primary winding connected to the main switching transistor and configured to convert the direct current into an electromagnetic signal;

an output winding configured to output the constant current according to the electromagnetic signal generated by the primary winding; and an auxiliary winding connected to the control module, in which the control module detects a degaussing time of the output winding via the auxiliary winding.

18. The control chip according to claim 17, wherein the control module further comprises a primary constant current control circuit, the primary constant current control circuit connects to the primary constant current circuit and configured to control the primary constant current circuit to output a constant current by controlling the main switching transistor to turn on or off, and the primary constant current control circuit comprises:

a primary current detecting and control module, configured to receive and sample a primary current sampling signal from the load module and to generate a fourth control signal according to the primary current sampling signal;

an error amplifier configured to receive the fourth control signal, compare the fourth control signal with a fourth reference voltage signal to obtain an error signal, and amplify the error signal to output an amplified error signal;

a multiplier configured to receive the voltage signal output from the filtering and rectifying module and the amplified error signal output from the error amplifier and to output an over-current turn-off reference signal according to the voltage signal output from the filtering and rectifying module and the amplified error signal;

an over-current comparator configured to receive the over-current turn-off reference signal and the primary current sampling signal and to output a fifth control signal by comparing the over-current turn-off reference signal to the primary current sampling signal in which a level of the fifth control signal turns over when a difference value between the over-current turn-off reference signal and the primary current sampling signal exceeds zero;

a valley detecting module configured to detect a voltage signal of the auxiliary winding and to output a sixth control signal according to the voltage signal of the auxiliary winding, in which the sixth control signal is valid when the voltage signal of the auxiliary winding reduces down to zero; and a PFC logic module configured to receive the fifth control signal and the sixth control signal and generate a seventh control signal that controls the main switching transistor to turn on or off according to the fifth control signal and the sixth control signal.

19. The control chip according to claim 12, wherein the dummy load control module is further configured to generate a primary constant current control signal, and the PFC logic module is further configured to receive the primary constant current control signal and to control the primary constant current control circuit to turn into dormancy according to the primary constant current control signal.

* * * * *